Dec. 21, 1926.

F. O'NEILL 1,611,363

PRESS WARE MANUFACTURE

Filed Feb. 23, 1926

Frank O'Neill
INVENTOR

BY
Geo E Kirk
ATTORNEY

Dec. 21, 1926.

F. O'NEILL

PRESS WARE MANUFACTURE

Filed Feb. 23, 1926

Frank O'Neill
INVENTOR
BY
ATTORNEY

Patented Dec. 21, 1926.

1,611,363

UNITED STATES PATENT OFFICE.

FRANK O'NEILL, OF TOLEDO, OHIO.

PRESS-WARE MANUFACTURE.

Application filed February 23, 1926. Serial No. 90,030.

This invention relates to shaping plastic material.

This invention has utility when incorporated in press mold machines for the production of glassware, as goblets, tumblers, glasses, jars, and similar articles.

Referring to the drawings.

Figure 2:
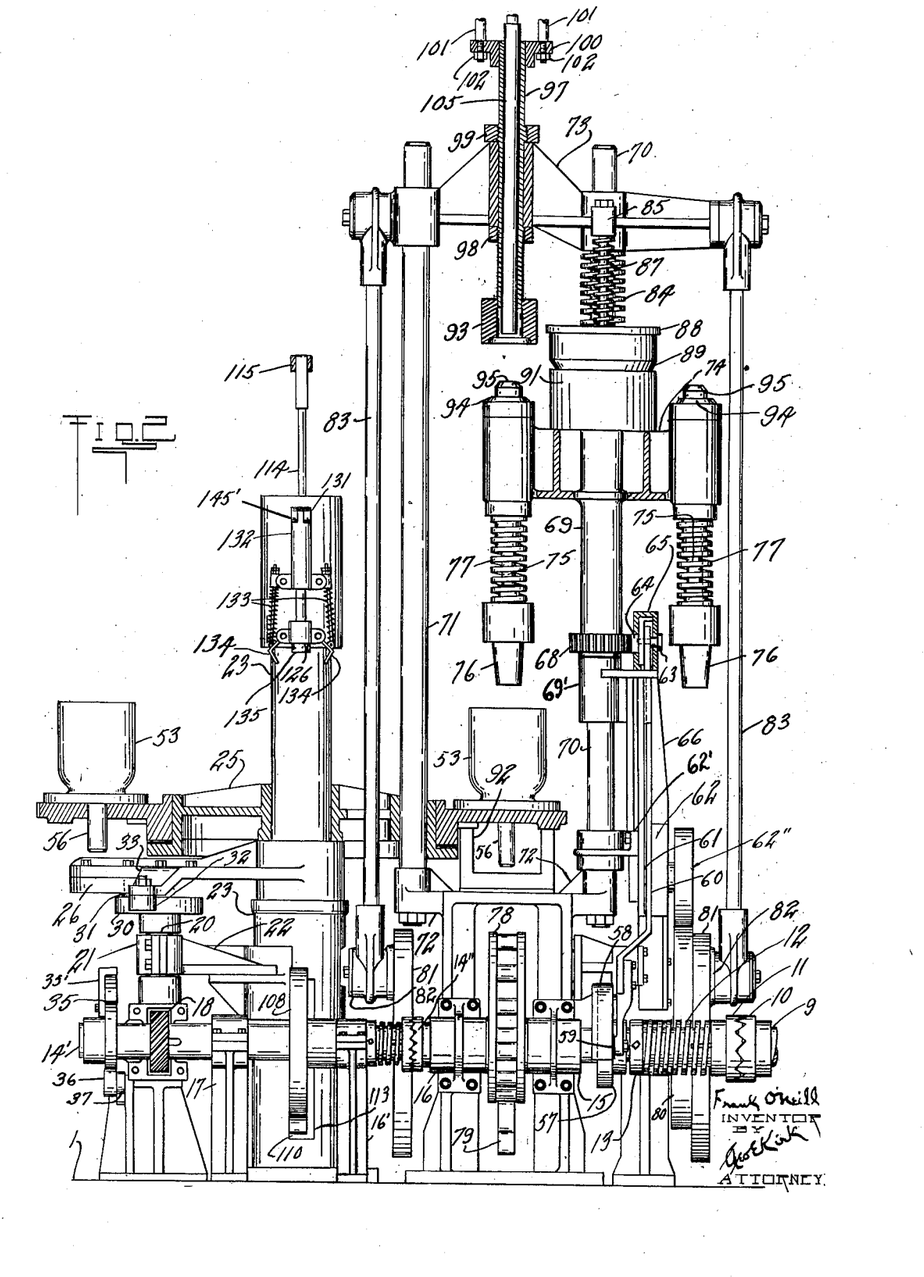
Fig. 2 is a side view looking into the apparatus of Fig. 1, parts being broken away.
Figure 6:
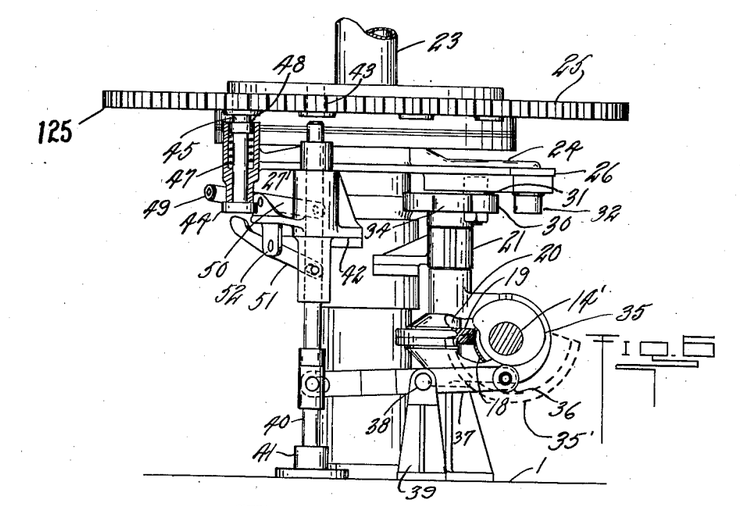
Fig. 6 is a fragmentary view from the left of Fig. 1.

Base 1 is shown as having mounted thereon variable speed motor 2 controlled by switch 2' having shaft 3 provided with coupling 4 connected to shaft 5 extending into speed reduction gearing housing 6, wherein this shaft 5 is provided with worm 7 in mesh with worm wheel 8 on shaft 9 having clutch element 10 opposed by clutch element 11 on the shaft 9 and normally thrust by spring 12 into holding relation as a yieldable coupling to collar 13 longitudinally adjustable on drive shaft 14 in alignment with the shaft 9. This adjustment of the collar 13 is to vary the slip release of the coupling. This shaft 14 is fixedly mounted in bearings 15, 16, carried by the frame or base 1. Shaft section 14' in alignment with the shaft 14, is connected thereto by coupling 14'' adjusted to release at a lower point than the coupling 10, 11. This shaft 14' is carried by bearings 16', 17. Beyond the bearing 17 from the shaft 9, this shaft 14' is provided with skew gear 18 in mesh with skew gear 19 on shaft 20 (Figs. 2, 6) carried by bearing 21 having bracket extension 22 from column 23 as mounted on the base 1. This column 23 has above this bracket 22, an oscillating arm 24 below the carrier or table 25 on this column 23.

Figure 1:
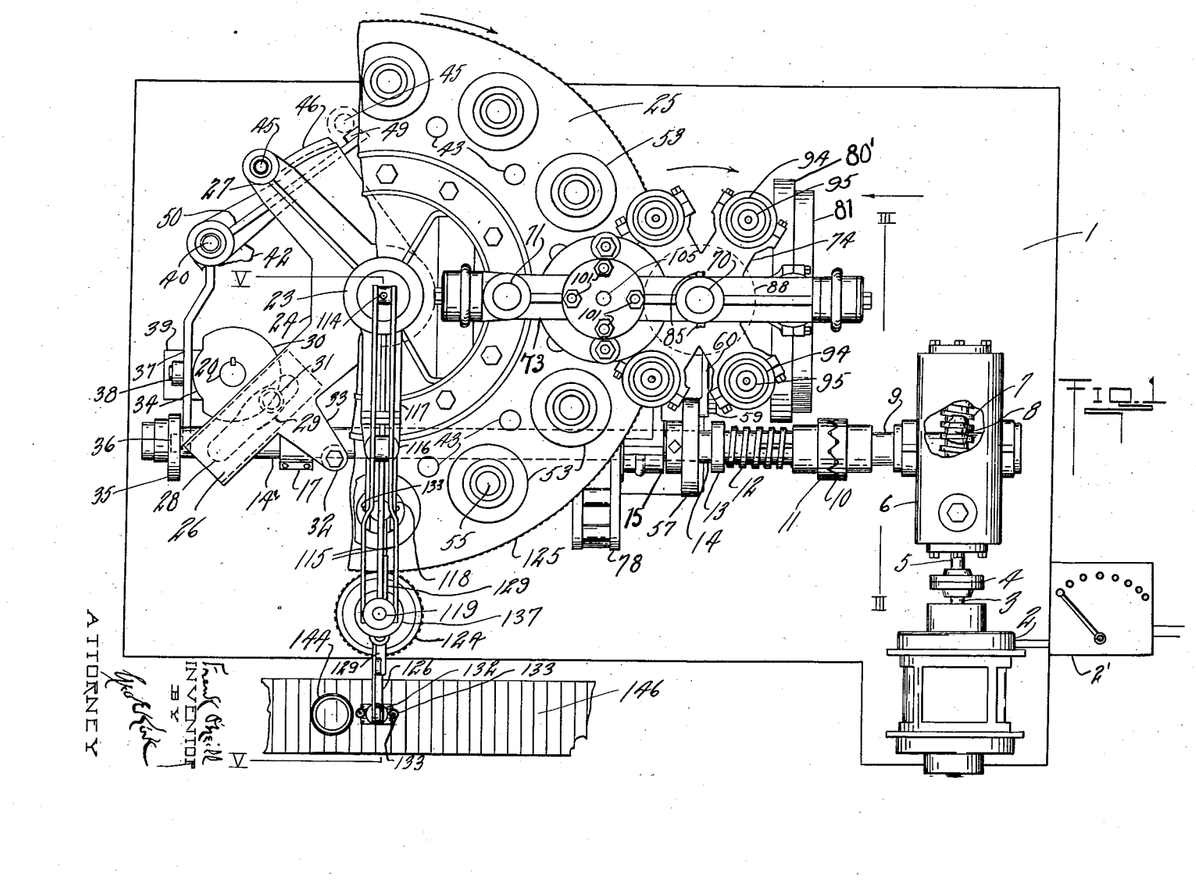
Fig. 1 is a plan view, with parts broken away, of an embodiment of the invention from a single driving source of mechanical power.
Figure 7:
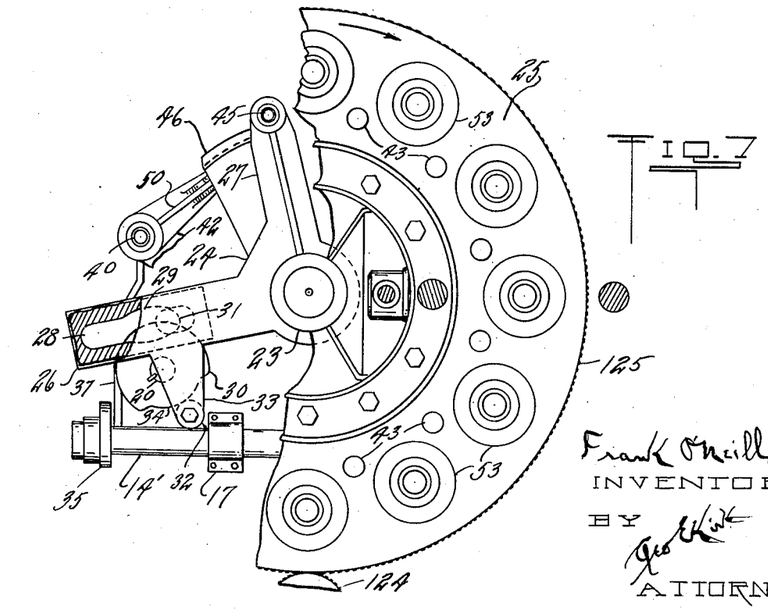
Fig. 7 is a plan view of some of the features of control as shown in Fig. 6, the parts here being in angularly shifted position from the showing in Fig. 1.

The oscillating arm 24 is provided with arms 26, 27 (Figs. 1, 7). The arm 26 is provided with slot 28 having medially widening portion 29. The shaft 20, above its bearing 21, carries crank disk 30 having wrist pin 31. This fixed shaft 20, as thus rotated from the main driving shaft 14 is effective to swing this oscillating mounting 24 on the column 23, as an axis, due to the coaction of the wrist pin 31 with the slot 28, 29. In the limit of rotation of the wrist pin 31 away from the shaft 14', the wrist pin 31 is in the widening region 29 of the slot 28. In this vicinity, the mounting 24 is maintained against vibration, due to pin 32 on extension 33 from the arm 26 coacting with cam portion 34 of the crank disk 30.

Mounted on the shaft 14', more remote from the bearing 17 than the gear 18, is cam 35, the under side of which coacts with roller 36 (Figs. 1, 2, 6) carried by lever 37 having fulcrum 38 mounted by bracket 39 rising from the base 1. The remote end of this lever 37 has loose engagement with bar 40 upwardly extending from base guide 41 and held, for vertical movement, by bracket 42 from the column 23. As the larger radius portion of the cam 35 engages the roller 36, this lever 37 is effective for upwardly shifting the bar 40 into recess 43 in the carrier or table 25. In the shorter radius region of this cam 35, cam patch 35' causes the bar 40 to descend. This action is timed with the oscillation of the member 33, 24, 25, 27. As the wrist pin 31 is effective for pulling the oscillator portion 27 toward the shaft 14', head 44 of pin 45 rides along fixed guide 46 holding this pin 45 against the resistance of spring 47 out of engagement with the carrier or table 25. As the limit position of swing of the oscillating mounting is reached, the head 44 of the pin 45 is engaged by roller 49 on lever 50 rocked by the upward movement of the bar 40, and the pin 45 is thus retracted to ride below the guide 46 against the action of the spring 47 as acting against collar 48. As the arm 27 is rocked to swing the head 44 clear of the roller 49, the pin 45 rides along the guide 46 to enter the next opening 43 adjacent the opening entered by the bar 40. As the bar 40 descends from such opening 43 for a succeeding step driving travel of the table 25, such bar 40, through lever 51 on fulcrum 52 insures thrusting of the pin 45 into an opening 43. Continued rotation of the disk 30 is effective to give driving travel to the mounting 24. As the limit of the driving stroke is reached, longer radius portion of the cam 35 is effective through the lever 37 to thrust the bar 40 upward into the succeeding opening or recess 43. Accordingly, as the crank disk 30 is further rotated, the pin 45 coacts for a repetition of this intermittent driving clockwise of the table 25.

Figure 5:
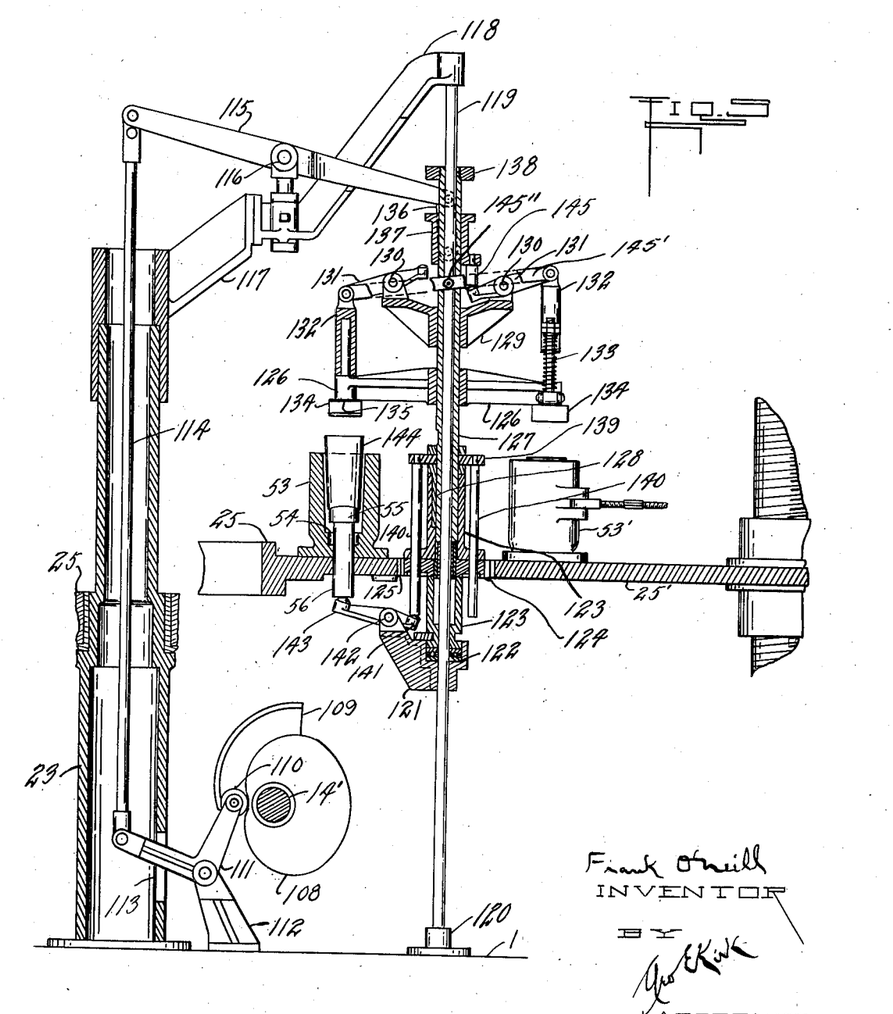
Fig. 5 is a view on the line V—V, Fig. 1, parts being broken away.

Mounted on the table 25, as an endless or annular series, are press molds 53 having open bottoms 54 in which are plungers or movable bottom sections 55 having stems 56 protruding below the carrier or table 25 (Fig. 5).

Figures 3, 4:
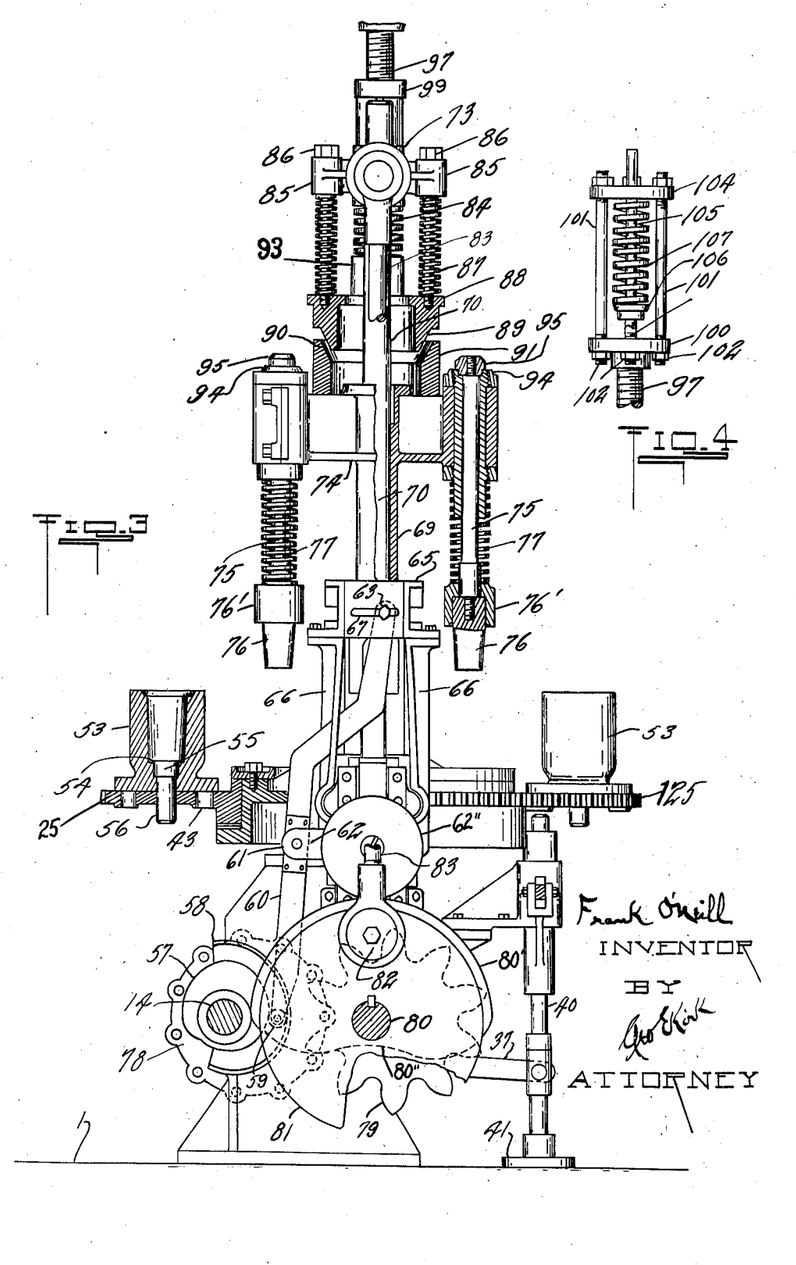
Fig. 3 is a view of the apparatus of Fig. 1, from the line III—III, parts being broken away.
Fig. 4 is a detail view of the device of the operating head or extension for plunger control.

Mounted on the shaft 14 adjacent the collar 13 is cam 57 (Fig. 3) having grooved portion 58. Riding in this cam 57, 58, is roller 59 carried by lever 60 having fulcrum 61 mounted by crosshead 62 vertically reciprocable in guide 62'. This lever 60 has its upper extent from the fulcrum 61 offset and provided with pin 63 engaging rack 64 reciprocable in guide 65 as carried by uprights 66 from the crosshead 62. The pin 63 as engaging the rack 64 extends through slot 67. This rack engages pinion 68 (Fig. 2) on upright sleeve 69 on rod 70 axially parallel with rod 71 and the column 23. Collar 69' vertically positioned by uprights 66, maintains the sleeve 69 in position axially of the rod 70. Bracket 72 rises from the base 1 for anchoring the lower ends of the rods 70, 71, and the guide 62'; the upper ends of said rods being connected by crosshead or brace 73, slidable therealong (Fig. 3).

Fixed with the sleeve 69 is carrier 74 having depending stems 75 terminating in heads or plungers 76 yieldably spaced by spring 77 from the carrier 74. This carrier 74 is eccentric of the carrier 25 and is here shown as having in its annular series of plungers 76 a different number of said plungers 76 than the number of molds 53 as carried by the press mold carrier or table 25. The rack 64 as controlled by the cam 57, 58, is effective for imparting to this carrier 74 a step-by-step or intermittent driving action from the continuously rotating main driving shaft 14 in step with the rotations as intermittently occurring for the table 25. These operations bring a mold 53 into registering position in alignment with the overhang position of a plunger 76.

The shaft 14, between the brackets 15, 16, is provided with eccentric pin-carrying gear 78 in mesh with eccentric tooth gear 79 on shaft 80 parallel to the shaft 14. This shaft 80, on each side of the gear 79, is provided with a crank disk 81 carrying oppositely extending wrist pins 82 from which upwardly extend connecting rods 83 to crosshead 73 for reciprocating such crosshead on the rods 70, 71, against the resistance of spring 84 between this crosshead 73 and the carrier 74. The crosshead 73 has, laterally of the rod 70, ears 85 carrying pins 86 loose therein. About these pins 86 are compression springs 87 thrusting clutch member 88 away from the crosshead ears 85, which limit of thrust is determined by the pins 86 as to threaded engagement with the member 88.

The shaft 80 also carries cam having a long radius portion 80' and short radius portion 80" against which rides roller 62" carried by the crosshead 62. This cam portion 80" allows descent of the carrier 74 for the plunger 76 to enter a mold 53 as press ring 76' rests on such mold 53. As the crosshead 73 now descends to bring clutch face 89 of the member 88 into engagement with opposing clutch face 90 in the member 91 carried by the carrier 74, the springs 87 compress and there is yieldable braking or holding action for the carrier 74 against rotation as the plunger 76, at registry position has entered such one-piece press mold 53 on the table 25 to form an article of glassware in such mold. Mounted upon the bracket 72 is support 92 for the table 25 (Fig. 2) which support sustains the press mold 53 during this plunger pressing operation.

As the crosshead 73 descends, cap 93 moves downward therewith to coact with seat 94 about head 95 of plunger stem 75. As the resistance of the plastic glass in the mold 53 against the blank mold portion 76 tends to compress spring 107, the head 95 moves away from the seat 94, and into the cap 93. This cap 93 is held in seating position by sleeve 97 extending through the crosshead 73 with which it is mounted against reciprocation by nuts 98, 99. The upper portion of this sleeve 97 carries yoke 100 from which upwardly extend bolts 101. These bolts are fast in this yoke 100, with their heads 102 against the lower sides of said yoke. These four bolts 101 upwardly extend loosely through opposing yoke 104 with which these bolts 101 are adjustable. Loosely protruding through this yoke 104 is stem 105 which, toward the yoke 100, carries a collar 106. Between this collar 106 and the yoke 104 is the compression spring 107. Accordingly, in the descent of the crosshead with the sleeve 97 and the bolts 101 to the yoke 104, there is through the spring 107 a yieldable transmission to the stem 105 through the opening in the sleeve 97 in the downward travel of this stem 105 against the head 95 of the plunger stem 75 for thus yieldably seating the plunger mold element 76 into the press mold 53 at the station of rest. The pressure of this spring is a factor in effecting the set of the glass.

The continuously rotating drive shaft 14 is effective through eccentric gear transmission 78, 79, to effect final pressing of ware at once the cam 80' has acted for locating a press ring 76' on a mold. The yieldable couplings 11 and 14" take up unusual resistance conditions and smooth out load on the motor while maintaining adjusted angular relationship between the cooperative driving features of construction. This sequence of operation from a continuous driving source may be timed for rapid production of a high quality of glassware in this multiple station mold machine, whether the machine comprises one or more tables. Such second table 25' carrying the molds 53' may have gear connection for determining synchronism with the table 25.

The ware as thus produced at the station of rest adjacent the rods 70, 71, may be automatically removed from the machine by a take off. To this end, there is disclosed herein on the shaft 14', between the bearings 16', 17, cam 108 (Fig. 2) having guide groove 109. Co-operating with this cam 108, 109, is roller 110 (Fig. 5) on angle lever 111 mounted by a bracket 112, fixed with the base 1. This angle lever has an arm thereof extending through column opening 113. From this angle lever 11 there extends upwardly in the column 23, link 114 to lever 115 having adjustable fulcrum 116 carried by brackets 117, 118, mounted on the upper portion of the column 23 above the table 25 at a position herein shown as 90° from the station of rest for the press mold forming, and in practice one or more spaced points for the step reciprocation or positions for the mold 53 on the table 25 from such press forming station of rest. This bracket 117 has extension 118 for fixing upper end of rod 119 as axially parallel to the column 23, the lower end of this rod 119 being anchored by socket 120 with the base 1.

Fixed on the rod 119 below the plane of the table 25 is bracket 121 providing a pocket for anti-friction bearing 122. Riding on this bearing is carrier 123 having pinion 124 in mesh with peripheral series of teeth 125 on the table 25. Accordingly, in step with the intermittent rotation of the table 25, this carrier 123 is rotated. Upwardly from this carrier 123 is yoke 126 held for rotation with the carrier 123 by sleeve 127 having spline 128 coacting with the carrier 123. Carried by this sleeve 127 above the yoke 126 is bracket 129 having fulcra 130 for levers 131 outwardly extending to crossheads 132 from which depend yieldable links 133 for swinging gripping jaws 134 into ware co-operating position below seats 135 carried by the yoke 126.

As the link 114 in the column 23 moves upward, the radially extending lever 115 has its outer end descend. This outer end is connected through link 136 with collar 137 held against rotation with the sleeve 127. This descent of the collar 137 allows the sleeve 127, as carrying collar 138 on its upper end, to descend. This descent is effective through yoke 139 carrying depending pins 140 to have the depending pin 140 as passing through the gear 124 adjacent the table 25 strike the short end 141 of lever having fulcrum bearing 142 in the bracket 121. This causes long arm 143 of this lever 141, 143, to thrust upward stem 56 and thus move mold bottom 55 upward in the press mold 53 for thrusting formed article of glassware 144 upward partially out of the mold 53.

In the descent of this sleeve 127, the yoke 126 had its seat 135 brought into position more closely over the article of ware 144 as thrust theretoward so that gripping jaws 134 may surround this article 144. The descent of this collar 137 causes pin 145 to engage lever 131 as away from the column 23, for having its outer end move upward thus to release an article of ware 144 as carried by the gripping jaws 134 to deposit such ware 144 on conveyor 146 to be carried away from this press glassware forming machine. Simultaneously with the release of the ware over the conveyor, link 145' having fulcrum 145" is effective to cause the companion jaws 134 to grip an article of ware in the mold 53.

Further rotation of the cam 108 causes the lever 115 to oppositely oscillate thus lifting first this pin 145 clear of the lever 131 then to have the collar 137 engage the collar 138 to lift the yoke 126 with the jaws 134 as extending toward the column 23 gripping the just completed article of press ware and as so gripping such article lifting it upward clear of the mold 53. During this operation the lever 141, 143, rocks back to starting position so that mold bottom 55 settles back to initial position.

As the article 144 is clear of the mold 53, this lifting operation is completed and there is a uniform radius portion of the cam 108 holding the article thus lifted, while the table 25, in the sequence of the operations herein disclosed, rotates to bring another completed article of ware to this take-off station of rest. In this operation, the teeth 125 of the table 25 coact with the gear 124 and shift herein the take-off 180° to bring the completed article of ware into position over the conveyor 146 while the other discharge arm of this take-off is swung into position over the table 25, there taking hold of a succeeding press article of ware and repeating this cycle of operations. As shown there are twelve press molds and six plungers.

As herein disclosed the cycle of operations may proceed with rapidity on the idle stroke upward of the plunger with the sequence of forming operations in the downward stroke as ring 76' yieldably closes the mold 53 with the plunger 76 further proceeding into the mold 53 as a speed rate or slight pause only sufficient to establish the set of the molten glass. Such rate of operation with the quiet recover stroke of the cycle permits quantity out-put in the machine operations.

What is claimed and it is desired to secure by Letters Patent is:—

1. A continuous rotation driving shaft, a table, transmission means between the shaft and table, a mold carried by the table, a plunger for entering the mold, and driving connections independently of said transmission means from the shaft for shifting the plunger in a plane parallel to the plane of said table.

2. A continuous rotation driving shaft, a table, transmission means for effecting step-by-step rotation of the table, an annular series of molds carried by the table, a plunger for entering a mold while in a position of rest, and connections eccentric of the table independently of said transmission means from the driving shaft for shifting the plunger in a direction parallel to the plane of rotation of said table.

3. A continuous rotation driving shaft, a table, transmission means for effecting step-by-step rotation of the table, a series of molds carried by the table, a series of mold coacting plungers disposed in a plane parallel to the plane of the table, and connections for shifting a plunger into alignment with the mold as reaching a station of rest, and additional actuation connection independently of said transmission means from said driving shaft for effecting relative telescoping travel between the plunger and mold.

4. An annular series of molds, a carrier for the molds, an annular series of plungers, a carrier for the plungers, said carriers being axially parallel, and a continuously rotating driving shaft provided with intermittent driving connection rotating one carrier and a second intermittent driving connection for rotating the other carrier.

5. An annular series of molds, a carrier for the molds, an annular series of plungers, a carrier for the plungers, said carriers being axially parallel, a continuous rotation driving shaft, and an intermittent transmission from the shaft for one of the carriers independently of shifting the other carrier.

6. An annular series of molds, a carrier for the molds, an annular series of plungers, a carrier for the plungers, said carriers being axially parallel, a continuous driving shaft, a first intermittent transmission for the mold carrier, and a second intermittent transmission for the plunger carrier, each of said transmissions being from said driving shaft.

7. An annular series of molds, a carrier for the molds, a continuous rotation driving shaft, a locking bar for the carrier, an actuator pin for the carrier, an oscillating mounting for the pin, and actuating connections from the shaft for said oscillating mounting and controlling said bar.

8. An annular series of molds, a carrier for the molds, a continuous rotation driving shaft, a locking bar for the carrier, an actuator pin for the carrier, an oscillating mounting for the pin, actuating connections from the shaft for said oscillating mounting and controlling said bar, and a wrist pin actuated from said shaft for driving said oscillating mounting.

9. An annular series of molds, a carrier for the molds, a continuous rotation driving shaft, a locking bar for the carrier, an actuator pin for the carrier, an oscillating mounting for the pin, said mounting having a slot, a wrist pin engaged in said slot, and gearing from the shaft for driving said wrist pin and controlling said bar.

10. An annular series of molds, a carrier for the molds, a continuous rotation driving shaft, a locking bar for the carrier, an actuator pin for the carrier, an oscillating mounting for the pin, said mounting having a slot, a wrist pin engaged in said slot, a crank disk having a cam, and gearing from the shaft for driving said crank disk, and controlling said bar, there being a pin carried by the mounting engaging said cam.

11. An annular series of molds, a carrier for the molds, an annular series of plungers, a carrier for the plungers, a continuous rotation driving shaft, transmission from the shaft for the mold carrier, and an intermittent transmission from the shaft for the plunger carrier, said intermittent transmission including a pinion fixed with the plunger carrier and an oscillating rack for actuating said pinion.

12. An annular series of molds, a carrier for the molds, an annular series of plungers, a carrier for the plungers, a continuous rotation driving shaft, transmission from the shaft for the mold carrier, and an intermittent transmission from the shaft for the plunger carrier, said intermittent transmission including a pinion fixed with the plunger carrier, a rack, a lever for oscillating said rack, and a cam actuable from said shaft for oscillating said lever.

13. An annular series of molds, a carrier for the molds, an annular series of plungers, a carrier for the plungers, a continuous rotation driving shaft, two transmissions from the shaft one for each carrier, and plunger reciprocation mechanism actuable from said shaft.

14. An annular series of molds, a carrier for the molds, an annular series of plungers, a carrier for the plungers, a continuous rotation driving shaft, two transmissions from the shaft for the carriers, and plunger reciprocation mechanism actuable from said shaft including a speeded up ascent and at retarded descent transmitting drive for the plunger.

15. An annular series of molds, a carrier for the molds, an annular series of plungers, a carrier for the plungers, a continuous rotation driving shaft, two transmissions from the shaft one for each carrier, and plunger reciprocation mechanism actuable from said shaft including eccentric gearing.

16. An annular series of molds, a carrier for the molds, an annular series of plungers, a carrier for the plungers, a continuous rotation driving shaft, transmissions from the shaft for the carriers, plunger reciprocation mechanism actuable from said shaft, and a take-off actuable with the mold carrier.

17. An annular series of molds, a carrier for the molds, an annular series of plungers, a carrier for the plungers, a continuous rotation driving shaft, transmissions from the shaft for the carriers, plunger reciprocation mechanism actuable from said shaft, a take-off actuable with the mold carriers, said molds having shiftable bottoms, and a connection from said shaft for moving the bottom of the mold as at said take-off for shifting an article of ware as to the mold into position for engagement by said take-off.

18. A press ware machine comprising a continuous rotation driving shaft, molten glass press devices driven from said shaft including a plunger and eccentric gears, a motor for the shaft and mechanism for yieldably connecting the motor to said shaft, whereby resistance to said plunger may not stall the motor.

19. A press ware machine comprising an axially parallel mold plunger and take-off carriers, a continuous rotation driving shaft, and transmission connections from said shaft to the respective carriers.

20. A press ware machine comprising a series of press molds, a series of plungers, a continuous rotation driving shaft, and transmissions from the shaft for controlling said molds and plungers including three independent intermittent driving connections each from said shaft.

21. An annular series of molds, a carrier for the molds, a continuous rotation driving shaft, transmission means from the shaft for effecting step-by-step rotation of the carrier in providing stations of rest, a hollow column for the carrier, a take-off mounted adjacent a station of rest, and connections from the driving shaft through the column to actuate said take-off between steps of carrier travel.

22. An annular series of molds, a carrier for the molds, a hollow column for the carrier, a drive for the carrier, a take-off, and transmission connections from the carrier drive through the hollow column for the take-off.

23. An annular series of molds, a carrier for the molds, a drive for rotating the carrier, a take-off, and transmission connections from the carrier drive concentric of the carrier for actuating the take-off.

24. An annular series of molds, a carrier for the molds, a drive for rotating the carrier, a take-off, and an actuator for the take-off including a connection from the drive extending to concentric of the carrier and thence radially to the take-off to permit location of the take-off in different angular positions as to the carrier.

25. A press ware machine comprising a press station, a mold, a drive, transmission means for shifting the mold to the press station, a plunger for the mold, a control from said drive for positioning said plunger in the mold at the press station, and a press device yieldably actuated from said drive for thrusting the plunger into pressing position in said mold.

26. A press ware machine comprising a mold, a plunger for the mold, a continuous drive control including a cam having a dwell for positioning said plunger in the mold and holding the plunger in the mold at the dwell, a press device, and a common drive for said control and device.

27. A press ware machine comprising a mold, a plunger for the mold, a continuous drive cam control providing a dwell for positioning said plunger in the mold and holding the plunger in the mold at the dwell, a press device, and a drive having toothed transmission connections to said cam and device.

28. A press ware machine comprising a mold, a plunger for the mold, a cam control for positioning said plunger in the mold, a press device, an eccentric gear transmission for the device, and a common drive for said cam and transmission.

29. An annular series of molds, a toothed carrier for the molds, a continuous rotation driving shaft, transmission means from the shaft for effecting step-by-step rotation of the carrier in providing stations of rest, a one direction rotation take-off mounted adjacent a station of rest and in mesh with the toothed carrier for rotation in synchronism therewith, ware gripping means on the take-off and connections from the driving shaft to actuate said take-off ware gripping means between steps of carrier travel.

30. An annular series of molds, a toothed carrier for the molds, a drive for the carrier, a one direction rotation take-off, in mesh with the toothed carrier for rotation in synchronism therewith, ware gripping means on the take-off, and connections from the carrier drive for actuating the ware gripping means.

31. A press ware machine comprising a table, a continuous rotation driving shaft, an intermittent gearing connection between the shaft and the table, molten glass press devices including molds on the table, additional gearing from the shaft for said press devices, a motor for rotating the shaft, and yieldable connections between the intermittent gearing and the shaft and between the press devices gearing and the shaft.

32. A press ware machine comprising a mold table, a continuous rotation driving shaft, an intermittent gearing connection between the shaft and the table, a motor yieldably connected to the shaft, a plunger, and an intermittent gearing drive from the shaft for the plunger.

33. A press ware machine comprising a mold table, a continuous rotation driving shaft, an intermittent gearing connection between the shaft and the table, a motor yieldably connected to the shaft, a plunger, an intermittent gearing drive from the shaft for the plunger, a common motor drive, one adjustable yieldable connection between the motor and one intermittent gearing, and a different adjustable yieldable connection between the motor and the other intermittent gearing.

34. A press ware machine comprising a mold table, a plunger, a drive, intermittent gearing from the drive for shifting the table including a lever rockable in a plane parallel to the plane of the table, control means connecting the lever with the table in one direction of lever rocking, and connections from said drive for reciprocating the plunger toward and from the table.

35. A press ware machine comprising a mold table, having a peripheral series of teeth, a one direction step-by-step rotation take-off in mesh with the table teeth to be actuated in synchronism therewith, a drive for the table, and connections from said drive for reciprocating the take-off toward and from the table.

36. A press ware machine comprising a mold table, having a peripheral series of teeth, a one direction step-by-step rotation take-off in mesh with the table teeth to be actuated in synchronism therewith, a drive for the table ware gripping jaws carried by the take-off, and connections from said drive for reciprocating the take-off toward and from the table for operating said jaws in effecting such step by step rotation one direction driving of the take-off.

37. A press ware machine comprising a carrier, a mold mounted thereby, a plunger, a relatively movable mold engaging ring normally shiftable into mold engagement with the plunger, and rotatable driving means provided with intermittent drive transmission connection to the carrier, and an additional intermittent drive transmission connection to actuate said plunger and ring.

38. A press ware machine comprising a carrier, a mold mounted thereby, a first plunger, a relatively shiftable mold engaging ring normally shiftable into mold engagement with the plunger, rotatable driving means provided with a crosshead, a supplemental plunger yieldably connected to the crosshead and shiftable with the crosshead to depress the first plunger and ring, and rotary driving means for actuating the crosshead.

39. A press ware machine comprising a rotatable mold carrier and a drive therefor embodying a shaft eccentric of said carrier, a wrist pin carried by said shaft, an arm coaxial with the carrier having a slot engaged by said wristpin to effect oscillation of the arm, and connections from the arm for intermittently operating said carrier.

40. An annular series of molds, a carrier for the molds, an annular series of plungers, a carrier for the plungers, a continuous rotation driving shaft, transmissions from the shaft for the carriers, plunger reciprocation mechanism actuable from said shaft, a second mold carrier, and a take-off actuable with the mold carriers for transferring ware therebetween.

41. An annular series of molds, a carrier for the molds, an annular series of plungers, a carrier for the plungers, a continuous rotation driving shaft, transmissions from the shaft for the carriers, plunger reciprocation mechanism actuable from said shaft, a take-off actuable with the mold carriers, and a second mold carrier operable in synchronism with said plunger carrier to which the take-off effects delivery.

42. An annular series of molds, a carrier for the molds, a continuous rotation driving shaft, transmission means from the shaft for effecting step-by-step rotation of the carrier in providing stations of rest, a hollow column for the carrier, a take-off mounted adjacent a station of rest, connections from the driving shaft through the column to actuate said take-off between steps of carrier travel, and a second carrier operable in synchronism with the take-off to which the take-off effects delivery.

43. An annular series of molds, a first carrier for the molds, a continuous rotation driving shaft, transmission means from the shaft for effecting step-by-step rotation of the carrier in providing stations of rest, a take-off mounted adjacent a station of rest, a second carrier for molds connected for operation in synchronism with said first carrier, drive connection directly between one carrier and the take-off for causing the take-off and carrier to shift in synchronism, ware gripping means on the take-off, and connections from the driving shaft to actuate said take-off ware gripping means between steps of carrier travel.

44. An annular series of molds, a first carrier for the molds, a drive for the carrier, a take-off, a second mold carrier to which the take-off delivers, drive connections directly between one carrier and the take-off for causing the take-off and carrier to shift in synchronism, ware gripping means on the take-off, and connections from the carrier drive for operating the take-off ware gripping means.

45. A press ware machine comprising a pair of mold tables, each having a gear, a step-by-step one direction rotation take-off, including gearing in mesh with said table gears, driving means for the tables, ware gripping means carried by the take-off, and connections from said driving means for reciprocating the take-off toward and from one of the tables and operating said ware gripping means.

46. A press ware machine comprising a pair of mold tables, each having a gear, a step-by-step one direction rotation take-off therebetween having a gear in mesh with said table gears, driving means for the tables in synchronism, ware gripping means on the take-off, and connections from said driving means for reciprocating the take-off toward and from the tables for operating said ware gripping means.

In witness whereof I affix my signature.

FRANK O'NEILL.